United States Patent [19]

Carroll et al.

[11] Patent Number: 4,658,357
[45] Date of Patent: * Apr. 14, 1987

[54] TIME AND ACCOUNTING SYSTEM

[75] Inventors: Gary T. Carroll, Boulder County; Robert D. Hunter, Arapahoe County, both of Colo.

[73] Assignee: B.I. Incorporated, Boulder, Colo.

[*] Notice: The portion of the term of this patent subsequent to Oct. 22, 2002 has been disclaimed.

[21] Appl. No.: 657,002

[22] Filed: Oct. 2, 1984

Related U.S. Application Data

[63] Continuation-in-part of Ser. No. 539,049, Oct. 4, 1983, Pat. No. 4,549,264.

[51] Int. Cl.$^4$ .................................................. G01J 1/00
[52] U.S. Cl. ..................................... 364/406; 340/531; 340/539; 235/380
[58] Field of Search ................ 364/406; 340/539, 531, 340/534, 573, 572, 571, 506, 825.49; 375/23; 455/31, 343; 235/380

[56] References Cited

U.S. PATENT DOCUMENTS

| | | | |
|---|---|---|---|
| 3,478,344 | 6/1965 | Schwitzgebel | 340/539 |
| 3,805,265 | 4/1974 | Lester | 340/825.49 |
| 3,806,874 | 4/1974 | Ehrat | 235/380 |
| 3,984,807 | 10/1976 | Haemmig | 375/23 |
| 4,101,873 | 7/1978 | Anderson | 455/31 |
| 4,225,953 | 9/1980 | Simon | 340/825.49 |
| 4,275,385 | 6/1981 | White | 340/525 |
| 4,296,408 | 10/1981 | Neuringer | 340/825.49 |
| 4,347,501 | 8/1982 | Akerberg | 340/531 |
| 4,464,792 | 8/1984 | Owerko | 340/539 |
| 4,476,461 | 10/1984 | Carubia | 340/539 |
| 4,507,653 | 3/1985 | Bayer | 340/825.49 |
| 4,549,264 | 10/1985 | Carroll | 364/406 |

FOREIGN PATENT DOCUMENTS 0965179 3/1975 Canada ...................... 340/825.49

Primary Examiner—Michael R. Fleming
Attorney, Agent, or Firm—Bryant R. Gold

[57] ABSTRACT

A system for automatically logging the interaction between a plurality of objects. Small, self-contained transmitting beacon units are attached or carried by a first set of objects. These beacon units transmit a uniquely coded signal at prescribed intervals. A small, self-contained portable transceiving unit is attached to a second set of objects. The second set of objects typically moves in, about, and among the first set of objects, although either set may move relative to the other. The signals transmitted by the beacon units have a limited range. If the transceiving unit is within this range for a specified period of time, the unique code associated with the transmitted signal is time-logged into a memory element contained within the portable receiving unit. At the end of a specified period of time, such as a work day, the contents of the memory of the transceiving unit may be examined to determine the objects with which an interaction has been had during the time period. Alternatively, stationary receiving units may be selectively placed in and around the region wherein the first set of objects moves, and the receiving unit can then receive and time-log the unique codes associated with the objects that move within the specified limited range from the receiving unit. A computer may be used to analyze, sort, and generate reports from the data thus logged within the transceiving or receiving units. The system is particularly well suited for use as a time and accounting system in a custodial environment, such as a hospital or similar facility.

6 Claims, 13 Drawing Figures

TIME AND ACCOUNTING SYSTEM

CROSS-REFERENCE TO RELATED APPLICATION

This application is a continuation-in-part of application Ser. No. 539,049, filed 10/04/83, now U.S. Pat. No. 4,549,264.

BACKGROUND OF THE INVENTION

The present invention relates to a system for automatically logging the interaction between different objects, and for using this logged information in order to generate detailed reports, studies, and similar information. More particularly, the invention relates to a time and accounting system wherein the interaction between objects, at least one of which is moveable, is automatically and accurately recorded, thereby allowing detailed time studies, reports, billing statements, and the like to be quickly and accurately prepared.

Numerous methods have been used in the past for keeping track of the interactions that occur between two groups of objects, at least one group of which regularly moves relative to the others. One of the most common applications of such systems to date relates to the field of personnel time, care, and accounting systems. Hospitals, prisons, schools, factories, and other custodial institutions are the types of facilities where accurate records are often needed to indicate which personnel have come in contact with other personnel or objects during a specified period of time. In a hospital or health care facility, for example, accurate records must be maintained indicating when and for how long specified hospital employees, such as doctors or nurses, have come in contact with individual patients. Further, in order to operate such facilities efficiently, and thereby reduce operating costs, it is often necessary to perform time studies and the like to evaluate the most efficient use of the available personnel. Moreover, while many employees in such custodial facilities are typically paid on the basis of the number of hours worked, it is sometimes preferred to adjust wages based on the actual performance of the employee, e.g., where the employee has been within the facility, and/or how many specified contacts have been made during a given time period with other objects, patients, students, or the like.

Heretofore, such time care and accounting functions have largely been carried out manually. That is, a written log is maintained at an appropriate location and a written entry is manually made therein to indicate that a certain activity has occurred. The log entries must then be analyzed and sorted as required in order to reach the desired end result—a report, billing statement, paycheck, etc.

While computers have been used extensively in recent years to help analyze this kind of log-entry type data, the data must still typically be manually entered into the computer system. Manual log entries, whether to initially record the particular event, and/or to enter the logged event into a computer system, are undesirable because they are prone to error and they consume valuable time.

Some attempts have been made in the art to automatically generate an identifying log-event signal that is received at a central location, whereat it may be used to signal that the particular event has transpired and/or the location at which the event occurred. For example, in U.S. Pat. No. 3,478,344, there is disclosed a system for monitoring the behavior of supervised individuals. The system includes a portable transceiver worn on the wrist of the supervised individual. This portable transceiver is designed to respond to a interrogating signal received from a central station, and in response to this interrogating signal to transmit a coded signal back to the central station through a directional antenna system. When received at the central location, the signal indicates not only the location of the portable transceiver, but the identity (code) of the source of the signal. In this way, the location or position of a particular supervised individual within a specified boundary area may be monitored without disturbing the individual being watched. Moreover, should the individual wearing the wristband transceiver unit attempt to destroy the unit, self-actuating means are triggered that transmit a higher power signal back to the central station, thereby alerting the central station of the attempted destruction of the signal source.

Unfortunately, the system disclosed in U.S. Pat. No. 3,478,344 only gives an indication of the location of the supervised individual and the occurrence of a single event (attempted destruction of the device). Further, location information is only sent through the use of a directional antenna system, which requires that specialized antennas be strategically placed throughout the supervised area. Also, the wrist transceiver unit requires a rather cumbersome battery pack, worn on the belt on the supervised individual, in order to have power to operate. The device could thereby be easily rendered inoperable by merely disconnecting the power source from the transceiver (e.g., by cutting the wires). Such a system is, of course, ill suited for a hospital, health-care, or similar custodial facility because of the high power radiation signals that may be emitted from the device. Radiation signals in a hospital environment could easily interfer with sensitive monitoring equipment or could even be a hazard to the health of some of the patients (e.g., a patient using a pace maker).

In U.S. Pat. No. 4,347,501, an alarm signalling system is disclosed for use in hospitals, prisons, and similar custodial institutions. According to its teachings, an alarm signalling device—a portable unit that is easily carried in the pocket of a supervised individual—transmits an alarm signal whenever it is manually triggered by the person using the device. Each room or zone of the building or enclosed area where the supervised individuals are housed has a room code associated therewith. The alarm signalling device is adapted to have the room code set therein (through inductive transmission) whenever the device is carried into a given room or area. The set room code is automatically changed when the alarm sending device is carried from one room or location to another. When the manual alarm button is activated, the latest stored room code is sent by radio transmission to a central alarm receiver, where the information can be acted upon to get the needed assistance to the identified room or location as soon as possible.

While the system disclosed in U.S. Pat. No. 4,347,501 offers the advantage of a small portable unit that can have a single location code stored therein, the system must be manually activated before the room or location code may be acted upon. Further, the system does not provide any capability for logging a history of all the rooms or locations in which the unit has been carried over a period of time. That is, the device (as an alarm unit) is only concerned with the present, not the past; and to recreate the past, some means would have to be used to transmit the previous location code back to the central station whenever a new code was entered therein. This would require much more complex circuitry, especially at the central receiving station where the possiblity of receiving two or more alarm signals simultaneously from different portable units would have to be provided for. Such provisions (for handling two or more signals simultaneously) typically include using different radio transmission frequencies for each portable unit, including some complex buffering and interlocks schemes so that the information could eventually be combined, analyzed, and acted upon. As already mentioned, in a hospital or similar sensitive environment, it is generally preferable to minimize the use of radio transmission (radiation). If such radiation must be used, power levels must be kept low—meaning that transmission distances must be kept extremely short—and only a very small number of non-interferring frequencies should be used.

SUMMARY OF THE INVENTION

The present invention provides a unique system for automatically logging the interaction between a plurality of objects, and for quickly and efficiently analyzing, sorting, and combining this information into more usable forms. Small, self-powered transmitting units are selectively attached to a first set of objects. These units are adapted to transmit a uniquely coded signal at prescribed intervals, e.g., every fifteen seconds. A small self-powered, portable transceiving unit is likewise selectively attached to a second set of objects, which second set of objects typically moves in, about, and among the first set of objects. (Advantagously, the first set of objects may also move in, about, and among the second set of objects.) If the portable transceiving unit comes and remains within a specified distance of the transmitting unit for a predetermined period of time (e.g., for at least 30–45 seconds), the transceiving unit stores the unique code contained within the signal received from the transmitting unit in a specified memory location. This memory location is uniquely assigned to a specified time interval. That is, the memory of the portable transceiving unit is advantagously divided into memory cells corresponding to a specified time interval, such as one memory location or cell for every minute of a given time period. Hence, as the portable transceiving unit interacts with the transmitting units (that is, as the transceiving unit comes and remains within the specified distance of the various transmitting units for the specified period of time) the transceiving unit logs into its memory at a location corresponding to the time at which the interaction occurred the unique code of the transmitting unit with which it interacted. At the end of a specified time period, e.g., at the end of a work day, the memory contents of the transceiving unit may be examined and analyzed to accurately recreate the interactions that occurred between the object to which the portable transceiving unit was attached and the objects to which the transmitting units were attached.

In one embodiment of the present invention, the self-contained transmitting units may be selectively attached to patients, inmates, students, or other supervised personnel who are housed in a custodial facility. The portable transceiving units may then be selectively attached to supervisory personnel, such as nurses, doctors, guards, teachers, and the like. The supervisory personnel may then interact with the supervised personnel throughout a given work day without needing to consciously make any log entries as to which supervised personnel they have come in contact during the day. Rather, a unique code assigned to the transmitting unit of each supervised personnel will be automatically time-logged into the memory of the supervisory personnel's transceiving units whenever a specified contact (within a specified distance for a specified time) is maintained. At the end of the day or work shift, the memory contents of the supervisory personnels' transceiving units may be individually and collectively examined so as to create an accurate history of those supervised individuals with whom the supervisory personnel have come in contact with during the day. Advantageously, the memory content of the transceiving units may be downloaded to a central computer at the end of the work day, thereby allowing the analysis, sorting, and report generation of the time-logged data to be quickly and efficiently performed.

In another embodiment of the invention, the transceiving units may advantageously be placed in a charging unit after the end of a given work day so that batteries contained therewithin may be recharged. During this recharging period, the contents of the memory of the transceiving unit may be down-loaded to a central computer system. Moreover, the time at which the transceiving unit is removed from the charging unit at the beginning of a work day, and the time at which the transceiving unit is returned to the charging unit at the end of a work day, may also be automatically time-logged into either the memory of the transceiving unit or directly to the central computer. Thus, when the transceiving unit is assigned to a specific supervisory personnel, the time-in/time-out information may replace the function of a conventional time card system.

In a further embodiment of the invention, particuarlly when the invention is to be used in a rather large facility and wherein it would be desirous to known the location of given supervisory personnel throughout the work day, a stationary transceiver unit may be selectively positioned at key locations throughout the facility. This stationary unit is adapted to periodically transmit an interrogate signal over a very short range (e.g., 5–10 feet). If a portable transceiving unit is within the range of the stationary unit, the interrogate signal is received by the portable transceiving unit. The reception of the interrogate signal causes the portable transceiving unit to respond by transmitting back to the stationary unit a uniquely coded identifying signal. The stationary transceiving unit then sends this information to a central processing unit (CPU), thereby allowing the computer to keep a record of the location of each portable transceiving unit within the large facility at identified times. This information is very useful in performing time studies and the like.

The principle advantages of the invention are that detailed, accurate, logs may be generated automatically without any real conscious effort on the part of the supervisory personnel. All the supervisory personnel need do is to pick up the portable transceiving units at the beginning of the work day, carry this unit throughout the day, and return it to the designated area at the end of the work day. Further, the collective information provided in the memories of all of the transceiving units carried by all the supervisory personnel will also provide a very accurate, detailed record of the contact the supervised individuals have had with the various supervisory personnel. Thus, in case of a hospital for example, accurate patient records will be generated that reflect, in increments as small as a minute, the care that has been received by the patient. Such accurate records will make the generation of accurate billing statements a readily achievable goal. Moreover, the detailed reports, required for many custodial institutions (such as those required by governmental regulations), will be easily generated by using the information logged into the central computer over a period of time (e.g. weeks or months).

In still a further embodiment of the invention, portable transmitting units are attached to the first set of movable objects and a receiving unit is placed at key locations in and around the zone or area where the first set of objects normally moves. In a hospital, for example, substantially identical transmitting units, each pre-programmed with a unique code, may be carried (or otherwise attached to) patients, doctors, nurses, or other hospital personnel. Those transmitting units assigned to the most mobile of the moving objects, e.g., nurses, are adjusted to transmit their unique code words at relatively short intervals, such as every 3 or 4 seconds; while those units assigned to the least mobile of the moving objects, e.g., patients, are adjusted to transmit their unique code words at relatively long intervals, such as every 15 seconds. The receiving units are placed in each hospital room or other controlled area. Each receiving unit receives and "logs-in" the code words transmitted by each transmitting unit that is within the room (or within a specified range) of the receiving unit. The "logging-in" of the code words into the respective receiving units includes; (1) recording the received code word (which code word uniquely identifies the object from which the code word originated); (2) recording or otherwise encoding the time and date when the code word was received; and (3) recording or otherwise encoding the location at which the code word was received (which location is the location at which the receiving unit has been placed). Subsequent analysis of the data logged-in to all of the receiving units placed throughout the monitored area thereby allows a determination and record to be made of which objects came in contact with other objects, the time during which the contact occurred, and the location at which the contact occurred. This data analysis may advantageously be carried out by a control processing unit (CPU) that receives data from each receiving unit. The transmission of data from the respective receiving units to the CPU may occur over direct connection wires specifically installed for this purpose or may occur over conventional telecommunication (telephone) lines or other similar channels. Further, the data received and generated at the receiving unit may be stored within the receiving unit on a suitable non-volatile storage medium, such as magnetic tape or disk, for a convenient period of time (e.g., a day, a week) and subsequently delivered and/or transmitted to the CPU at a time when the CPU is available to analyze such data.

It is thus seen that the present invention provides a system wherein much of the manual, painstaking, entry of time/accounting data is eliminated, thereby reducing the operating costs of many institutions where such information must be kept. Moreover, the accuracy and completeness of the time/accounting data is greatly improved over what is achievable with prior art systems.

BRIEF DESCRIPTION OF THE DRAWINGS

The above and other objects, features, and advantages of the present invention will be more apparent from the following more particular description thereof presented in conjuction with the following drawings, wherein.

DESCRIPTION OF THE PREFERRED EMBODIMENT

The following description is of the best presently contemplated modes of carrying out the invention. This description, which relates to use of the present invention in a hospital environment, is not to be taken in a limiting sense, but is made merely for the purpose of describing the general operating principles of the invention. The scope of the invention should be determined with reference to the appended claims.

Figure 1:
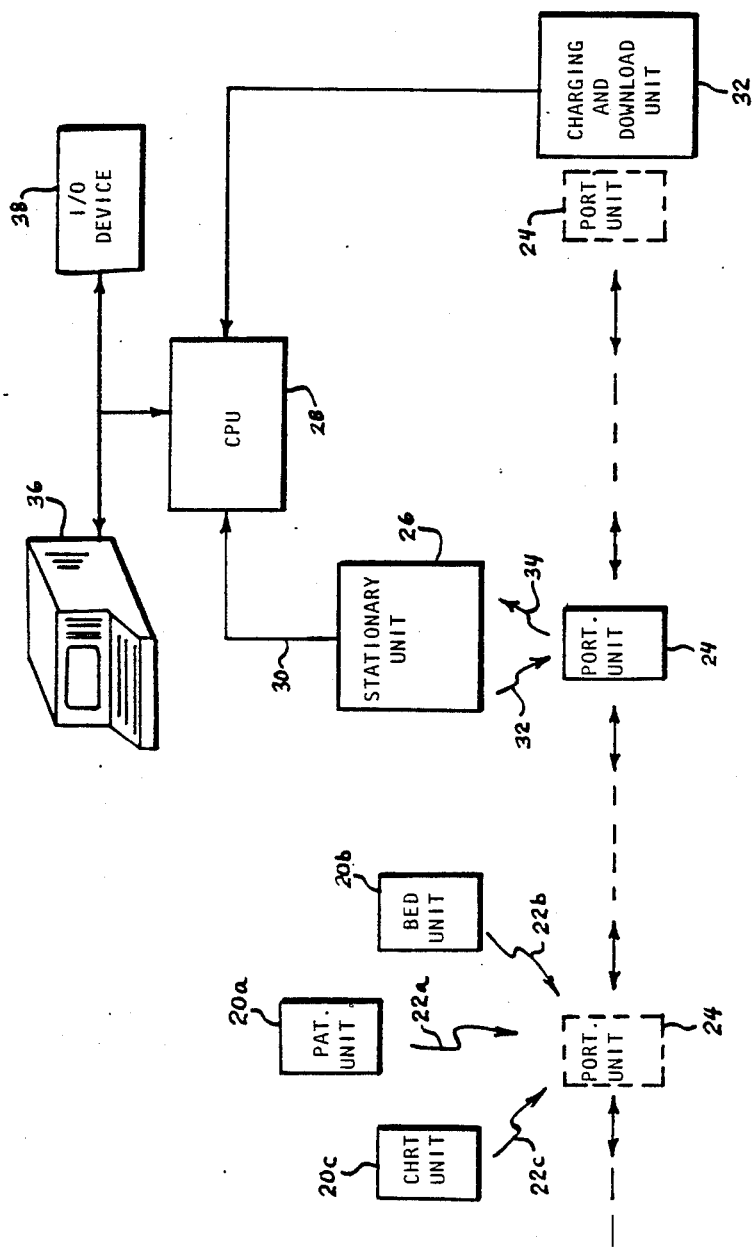
FIG. 1 is a block diagram illustrating the principal elements of one embodiment of the present invention.

Referring to FIG. 1, one embodiment of the present invention includes a self-contained transmitting unit that may be selectively attached to various objects asss-ociated with a given patient in a hospital environment. For example, a patient transmitting unit 20a may be physically attached to the wrist or ankle of the patient. A similar transmitting unit 20b may be attached to the bed of the patient. Likewise, a similar transmitting unit 20c may be attached to the medical chart of the patient. As explained more fully below, each of the transmitting units 20 transmit a uniquely coded signal, represented symbolically in FIG. 1 as the wavy arrows 22a, 22b, and 22c, at prescribed intervals. For example, each transmitting unit 20 may transmit its uniquely coded signal every 15 seconds.

A portable self-contained transceiving unit 24 is adapted to be worn by selected hospital personnel, such as nurses or doctors. If the portable unit 24 comes within a specified distance of any one of the transmitting units 20 for a specified period of time, then the unique code associated with the transmitted signals 22a, 22b, and 22c is time-logged into the memory of the portable unit 24. Typically, for a hospital environment, the portable unit 24 must come within five feet of a patient unit 20a, bed unit 20b or chart unit 20c for at least 30 seconds before the unique code associated with the patient, bed or chart will be stored in a memory location of the portable unit 24.

Selectively placed at key locations throughout the hospital are stationary units 26. These stationary units will typically be coupled to a central CPU 28 over a suitable signal channel 30. The stationary unit 26 transmits a interrogating signal, represented as the wavy arrow 32 at specified intervals, e.g., every second. If a portable unit 24 is within a specified distance of the stationary unit 26 when the interrogate signal 32 is transmitted, i.e., if the doctor or nurse carrying the portable unit responds by transmitting a response signal 34 back to the stationary unit 26. The response signal 34 includes a code that uniquely identifies the particular portable transceiving unit 24 that is within the specified distance of the stationary unit 26. The stationary unit receives this code and sends it to the CPU 28. The interrogate and response signals 32 ad 34 thereby provide a means whereby the proximity of selected personnel to the various stationary units 26 may be determined.

At the end of the day, the portable unit 24 is placed in a charging and down-load unit 32. The charging and down-load unit 32 is also coupled to the CPU 28 via a suitable channel 34. One purpose of the charging and down-load unit 32 is to charge the batteries that are contained within the portable unit 24. Another purpose of the unit 32 is to transfer the contents of the memory of the portable unit 24 to the CPU 28 via the channel 34. A further purpose of the charging and down-load unit 32 is to signal the CPU 28 as to the times at which the portable unit 24 is removed therefrom at the beginning of a work day or shift, and the time at which the portable unit is returned thereto at the end of the work day or shift. Because the portable unit 24 has a unique code associated therewith, the removal/replacement of the portable unit 24 from the charging and down-load unit 32 thus generates signals which provide the CPU 28 with time-in/time-out information, which information can be used to replace a conventional time card system.

Coupled to the CPU 28 are suitable input/output (I/O) devices that allow operator interaction with the CPU. For example, a conventional CRT terminal 36 may be coupled to the CPU 28 to allow an operator to interact with the CPU 28. Other suitable I/O devices 38, such as a printer, will also typically be used.

In operation, a doctor or nurse will have a specific portable unit 24 assigned to him or her. Upon removal of the portable unit 24 from the charging and down-load unit 32, a signal will be generated to indicate to the CPU 28 that the particular portable unit 24 has been removed, thereby indicating that the particular doctor or nurse is on the job and working. Throughout the work day, as the portable unit 24 is carried within a specified distance, e.g. five feet, of the various stationary units 26 placed throughout the hospital, signals will also be generated and transferred to the CPU 28 indicating that at that particular time the particular portable unit 24 passed by that specific stationary unit. Further, as the particular portable unit comes within a specified distance, e.g., five feet, of a given patient, the patient's bed, or the patient's chart for a specified time, e.g., at least 30 seconds, a unique code associated with that particular patient, bed, or chart will be time-logged into the memory of the portable unit indicating that these events have occurred. A memory location is reserved within the portable unit for every time interval, e.g. every minute of the work day. Hence, if the nurse or doctor carrying the portable unit 24 is near a particular patient for the specified time period, (i.e., if the nurse or doctor "interacts" with the patient) that patient's code will be logged into the memory corresponding to that particular minute of the day when the interaction occurs. If the doctor or nurse is not within the specified distance of a patient, a patient's bed, or patient's chart (or any other object or item of interest to which a suitable transmitting unit has been attached) for the specified time period, then there will be no code logged into the memory corresponding to those minutes of the day when no such contact or interaction occurred. At the end of the day, when the portable unit is returned to the charging and down-load unit 32, a signal is likewise generated so that the CPU 28 can determine the precise time at which the portable unit 24 was returned. Also, the information stored in each memory location of the portable unit is down-loaded from memory and transferred to the CPU 28 over the channel 34. Advantageously, this information indicates the interaction that occurred between the portable unit 24 and the various transmitting units 20 for every minute of the work day.

From the information transferred to the CPU 28, very detailed and accurate reports may be readily generated indicating the activities of any given hospital personnel (to which a portable unit 24 was assigned), as well as the detailed information as to which hopsital personnel have come in contact with a specific patient. This detailed information is invalueable for preparing accurate billing statements for the patient. For example, the combined information obtained from all of the portable units 24 carried by the hospital personnel for a given day may indicate that a particular patient came in contact with a given doctor for three minutes, and that the doctor was in contact with the patient's chart for two minutes. The information might also indicate that several nurses made contact with the patient for various time periods throughout the day, including contact with the patient's chart and patient's bed. Such information will allow a very detailed billing statement to be prepared for the patient, and the billing statement may be automatically generated with a minimum of manual effort.

Similarily, the information contained within the CPU provides an invaluable data base for performing time studies to indicate the movement of the various hospital personnel throughout the hospital on a given day or within a given time period. This information is again prepared with a minimum of manual or conscious effort. Typically, computer terminals 36 also be positioned throughout the hospital, such as at every nurses station. These remote terminals will not only allow the doctors and other hospital personnel to make contact with the CPU in order to review a given patient's history, but they also facilitate the easy entry of specific information into the CPU for a given patient, such as the type of medicine that is being administered, the quantity thereof, etc.

Advantageously, as seen in FIG. 1, all of the signals that must be transmitted from one unit to another need only be transmitted a very short distance. This means that the power level of such signals can be extremely low, thereby precluding any of the dangers that may otherwise result from transmitting radio signals (electromagnetic radiation) within a hospital environment. Further, as explained more fully below, because of the technology used, a single frequency, or at most two frequencies, may be used in order to allow the various transmissions to occur. These frequencies may be selected to be within a non-interfering frequency band, thereby insuring that no harmful effects will result.

Figure 2:
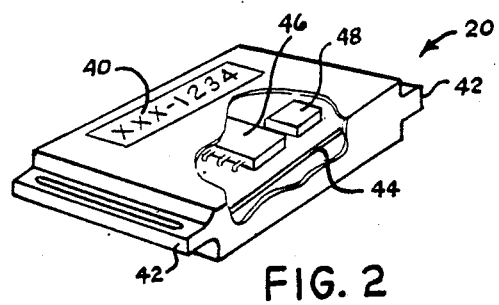
FIG. 2 is a cut away perspective view of one embodiment of a self-contained transmitting unit that could be used to realize the chart, patient, or bed units of FIG. 1.

Referring next to FIG. 2, a perspective view of a transmitting unit 20 is pictured with a portion thereof cut away. The unit is preferably a self-contained unit, including a battery, that is sealed in a suitable substance, such as polyurethene. If desired, the entire device can be thrown away once the battery contained there in has worn out. The device is immersible, thereby providing for its easy sterilization. An identifying number 40 is embossed directly on the package of the device to permanently identify the code that is transmitted by the device. Suitable mounting loops 42, or other connecting means, are used to facilitate the fastening of the device to a desired object, such as to a patient, a patient's chart, a patient's bed, or the like. Inside the device, a single printed circuit board 44 is used upon which an intergrated circuit package 46 and other electronic components 48 are attached. Once the printed circuit board has been fabricated and tested, the entire device is sealed in polyurethene, or other suitable material, thereby providing a protective package for the circuitry throughout the life thereof. As indicated, for a hospital environment, the polyurethene or other packaging material is also immersible, thereby allowing the device to be worn at all times, and thereby protecting the device from any hostile environment to which it may be exposed.

Figure 3:
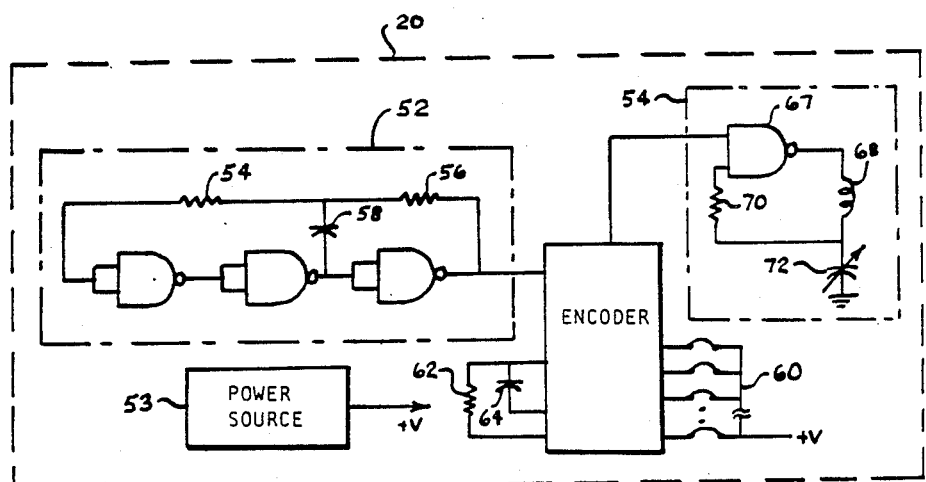
FIG. 3 is an electrical schematic diagram of the transmitting unit.

FIG. 3 shows an electrical block diagram of the circuitry that is used within the transmitting or beacon device 20 of FIG. 2. The circuitry includes an encoder 50, a timer ciruict 52, a power source 53, and a transmitting circuit 54. The power source 53 may be a conventional battery. The timer circuit 52 may be set to any suitable frequency depending upon the particular application. A simple ring oscillator, realized using conventional logic gates connected in series as shown, may be used for this oscillator. The period of oscillation is selected by specifying the values of the resistors 54, 56 and the capacitor 58. The encoder 50 is realized using a conventional commercially-available encoder circuit, such as is commonly used in garage-door openers. Such circuits allow a unique code, as determined by selectively opening the series of contacts 60, to be readily set for each device during the manufacture thereof. A suitable device that could be used for the encoder 50 is a ED-15, manufactured by Supertex. The resistor 62 and capacitor 64 are used with such circuits to define the length of a bit of data associated with the unique code. That is, the unique code defined by selectively opening the connections 60 is transmitted serially over signal line 66 to the transmitting circuit 54. The width or duration of each bit within this serial chain of bits is determined by the resistor 62 and capicator 64. In contrast, the frequency or repitition rate with which the entire coded word is transmitted to the transmitting circuit 54 is determined by the period of oscillation of the oscillator timing circuit 52. As explained previously, in the preferred embodiment, the coded words would be transmitted in a burst only about every 15 seconds.

The transmitting circuit 54 can be realized using a conventional NAND gate, the output of which is connected to a suitable inductive coil 68, the other end of which is coupled through a resistor 70 back to an input of the NAND gate 67. A capacitor 72 ties the common end of the inductive coil 68 and resistor 70 to ground. The specific values of the inductor 68 and capacitor 72 are selected so that the circuit is "tuned" at the desired transmission frequency.

Figure 4:
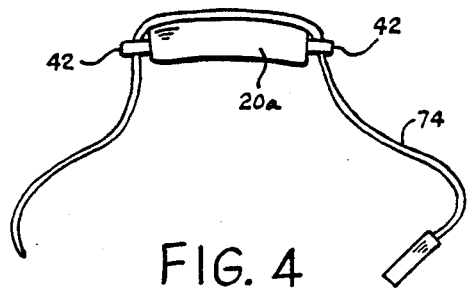
FIG. 4 is a side view of a transmitting unit attached to a wrist band, thereby facilating its easy attachment to a person.

Referring next to FIG. 4, there is shown a transmitting unit 20 to which a wrist band 74 has been attached through the mounting loops 42. In the preferred embodiment, this wrist band 74 may be of a conventional type presently used by hospitals to place ID bracelets on patients.

Figure 5:
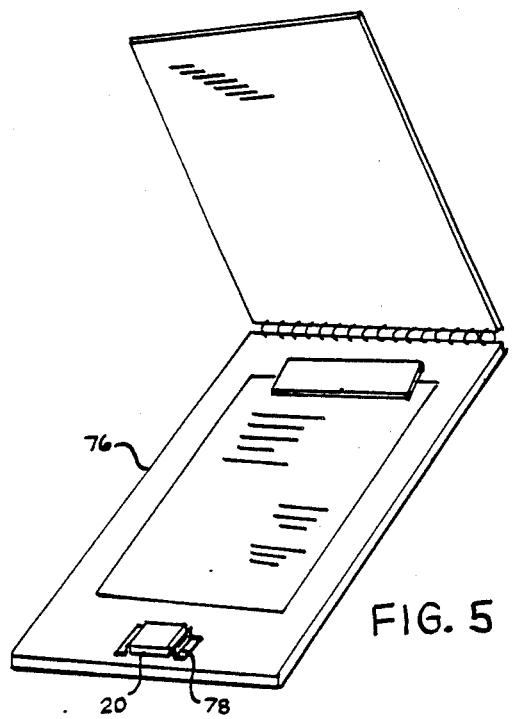
FIG. 5 is a perspective view of a bed chart to which a transmitting unit of the type shown in FIG. 2 may be attached.

Referring next to FIG. 5, a perspective view of a typical hospital patient chart 76 is shown. The transmitting unit 20 may be readily affixed thereto by means of any conventional clamping or affixing means 78.

Figure 6:
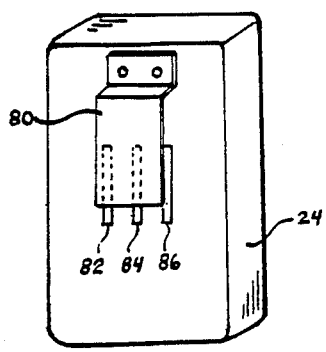
FIG. 6 is a perspective view of one embodiment of the portable transceiving unit of FIG. 1.

Referring next to FIG. 6, there is shown a perspective view of one embodiment of the portable transceiving unit 24. The view shown is from the back side thereof, and shows a protruding hook or clip 80 that is used to fasten the unit 24 to the belt or other clothing or garment of the user thereof. This same hook or clip 80 may also be used to fasten the unit to the charging and download unit 32 at the end of the work shift. Exposed slots 82, 84, and 86, or equivalents, are likewise provided on the unit 24 so as to provide direct electrical connection with the charging and down-load unit 32 when the portable unit 24 is placed therein at the end of the work shift. Alternatively, signals transmitted from the transceiving unit 24 to the charging and download unit 32 may be inductively coupled from one unit to the other without the need of a direct electrical connection. Similarly, the batteries or battery within the portable unit 24 may be recharged by power derived from an inducctively coupled power signal received from the charging and download unit 32. Inductively coupling a power signal in this fashion is fully disclosed in apending patent application Ser. No. 437,841, filed Oct. 20, 1982, assigned to the same assignee as in the present application.

Figure 7:
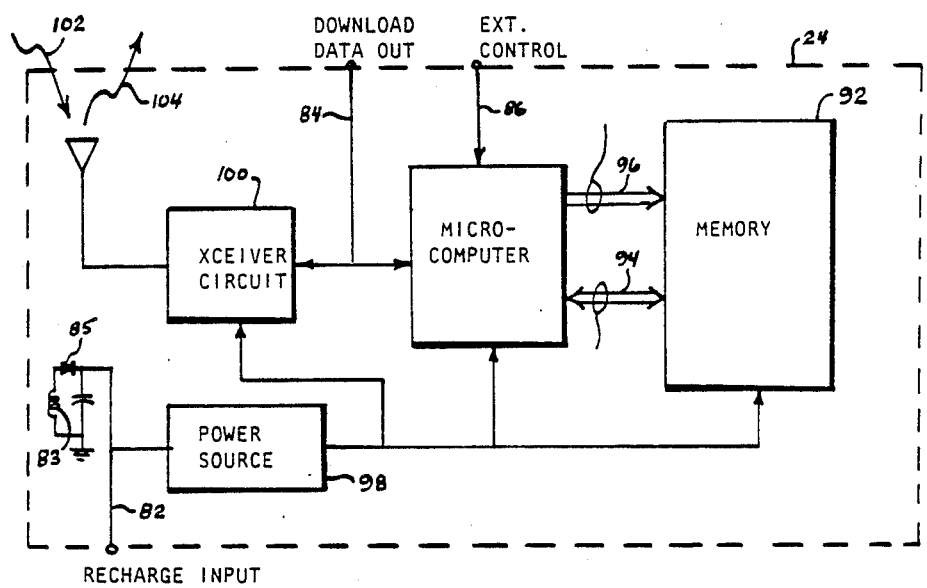
FIG. 7 is an electrical block diagram of the portable transceiving unit of FIGS. 1 and 6.

FIG. 7 is an electrical block diagram of the circuitry employed within the portable charging unit 24. The heart of the unit 24 is a microcomputer 90 having a suitable memory element 92 coupled thereto. Data can be readily transferred between the microcomputer 90 and memory 92 over the data bus 94. The particular address to or from which data is to be written or read is specified by the microcomputer 90 over an address bus 96. A rechargeable power source 98 provides the needed power for the microcomputer 90 and memory 92, as well as for the transceiver circuit 100. The transceiver circuit 100 receives signals 102 and passes the information contained therein to the microcomputer 90. It also receives data from the microcomputer 90 and allows it to be transmitted as signals 104. The transceiver circuit 100 may be of any conventional design.

As indicated previously, a key feature of the present invention is the manner in which the memory 92 is allocated. A particular memory location within the memory element 92 is set aside for a desired time interval within the time during which the portable unit 24 is used. In the preferred embodiment, the memory element 92 is a conventional CMOS 16K RAM memory, such as the model 5516 manufactured by Toshiba. As those skilled in the art recognize, such a memory may have over 2000 eight bit words stored therein. Therefore, by setting aside an eight bit word memory location for each minute, enough memory locations are provided for over 17 hours of operation. Advantageously, this means that the particular portable transceiving unit 24 could be used through two consecutive eight hour work shifts by two different nurses, or other hospital personnel, if desired. Assigning a given memory location to a given time of the day can be realized by periodically incrementing the address information transferred from the microcomputer 90 to the memory 92 over the address bus 96. Such address incrementing can be readily achieved by properly programming the microcomputer 90, and by taking advantage of the internal clock signals used therein.

The microcomputer 90 is likewise realized using a CMOS intergrated circuit, such as the model 80C48 microcomputer manufactured by numerous semi-conductor manufacturers. It is submitted that with the assistance of the flow chart of FIG. 11, as well as the other information provided herein, those skilled in the microcomputer art could program such a microcomputer circuit in order to achieve the desired functions referred to herein.

Referring back to FIG. 6, it is noted that the entire transceiving circuitry is realized in a relatively small package. This is because the CMOS circuitry used is configured to achieve the desired function with only three or four integrated circuits, plus associated discrete components. Thus, the physical dimensions of the preferred embodiment of the portable unit 24 are only about five to six inches high, two inches wide, and three-quarter inches thick. As such, the device can be readily inserted into a pocket or attached to the belt of the user thereof.

Figure 8:
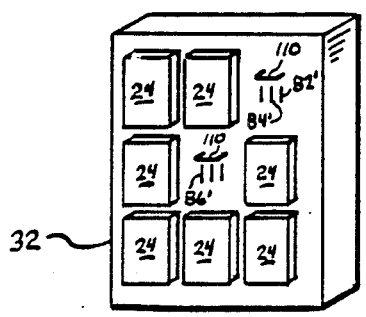
FIG. 8 is a perspective view of the charging and down-load unit of FIG. 1.

FIG. 8 depicts a perspective view of a chraging and down-load unit 32 to which a plurality of portable units 24 have been attached. In the embodiment shown, up to nine portable units 24 may be attached to the single charging and down-load unit 32. However, a charging and down load unit 32 adapted to handle any number of portable units 24 could be easily configured.

The unit 32 includes suitable means for attaching the portable unit 24 thereto, such as a protruding loop 110 to which the hook or clip 80 (FIG. 6) of the portable unit 24 may be attached. Also included are a pluarilty of contacts 82', 84', and 86', adapted to make contact with the corresponding slots 82, 84, and 86 of the portable unit 24 when the portable unit 24 is installed (hung from) the unit 32. It is through these contacts that power may be transferred to the portable unit 24 for charging the power source 98 thereof, and for other desired functions associated with the charging and down-load operation. Of course, there exists numerous alternative methods and techniques for coupling electrical energy to and from the portable unit 24 once it is installed in the charging and down load unit 32, such as inductive coupling as referred to previously. What is depicted in FIGS. 6 and 8 is only for illustrative purposes, and is not to be taken in a limiting sense.

Figure 9:
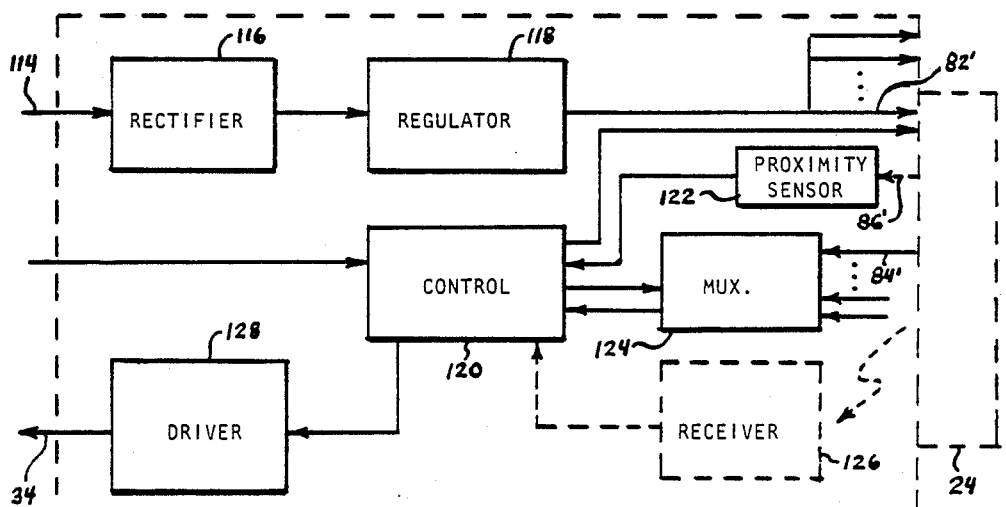
FIG. 9 is an electrical block diagram of the charging and down-load unit of FIGS. 1 and 8.

FIG. 9 is a block diagram of the circutry of the charging and download unit 32. Typically, the unit 32 is connected to a source of AC power 114. This AC power is rectified in a rectifier circuit 116, regulated in a regulator cicuit 118, and delivered to an appropriate connector 82' so that a specified charging current can be deleivered there through to a portable unit 24 attached to the charging unit 32. If inductive coupling is employed, loops or turns of wire are respectively placed in the portable unit 24 and the charging unit 32. In close proximity to each other, these loops function as the primary and secondary windings of an air core transformer. Therefore, an alternating signal placed on the primary winding (the charging unit 32) is coupled to a secondary winding 83 of the portable unit 24, see FIG. 7, whereat it may be rectified, by a diode 85, regulated (if needed), and converted to a charging current for the power source 98 of the portable unit 24.

A control circuit 120, which control circuit may be realized using a CMOS mircocomputer chip as is used in the portable unit 24, is provided to pass data to and from the memory 92 of the portable unit 24. A suitable proximity sensor 122 is used to sense when a portable unit 24 has in fact been placed on the charging and down load unit 32. This proximity sensor 22 may be realized using numerous conventional techniques; but preferably it is something as simple as a contact 86' making contact with a connector 86 of the unit 24, thereby functioning as a switch whose contacts are closed when a portable unit 24 is installed on the unit 32. Alternatively, a microswitch could be used within the unit 32 so that a switch closure or opening would occur whenever the portable unit 24 is installed on the hook 110. Still alternatively, an inductively coupled signal, if of sufficient magnitude, could be used to indicate that the portable unit 24 was properly installed in the charging and download unit 32.

Data may be transferred from the portable unit 24 through the charging and down-load unit 32 to the CPU 28 either directly or indirectly. If a direct method is used, then data is directly transferred out of a download data out terminal 84 (FIG. 7) through a suitable connector 84' to a multiplexer 124 within the charging and download unit 32. A multiplexer is used in order to allow data from any portable unit to be transferred therethrough through the control element 120 to the CPU 28. If an indirect download method is used, then the contents of the memory 92 of the portable unit 24 are passed through the transceiver circuit 100 and transmitted to a receiver circuit 126 within the charging and download unit 32. When this indirect download method is used, the multiplexer 124 is not needed because the control element 120 controls which portable unit is being downloaded at any given time. Data received from the memory of the portable units 24 is transferred through a suitable driver circuit 128 to the CPU 28 over the channel 34.

Figure 10:
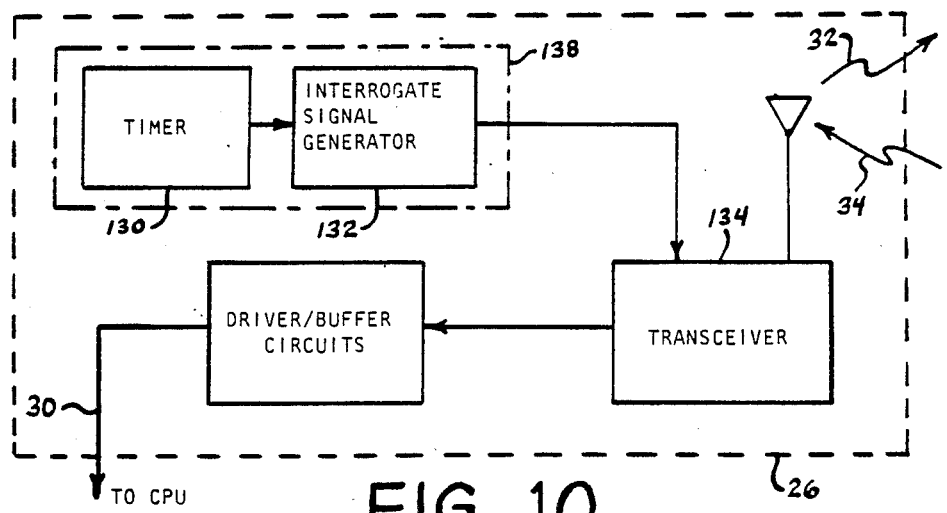
FIG. 10 is an electrical block diagram of the stationary unit of FIG. 1.

Referring next to FIG. 10, a block diagram of the stationary unit 26 is shown. This unit comprises a timer circuit 130 and an interrogate signal generator 132, coupled to a transceiver circuit 134. The timer circuit 130 determines how often an interrogate signal is generated. Once triggered by the timer circuit 130, the interrogate signal generator 132 sends the interrogate signal to the transceiver circuit 134 where it is transmitted from the stationary unit 126. If a portable unit 24 is within a specified distance of the stationary unit 26 when the interrogate signal is transmitted, then it responds with a response signal 34 that is likewise received by the transceiver circuit 134. This signal uniquely identifies the particular portable transceiver unit 24 that has been interrogated, and this information is sent through appropriate driver/buffer circuits 136 to the CPU over the communications channel 30. The timer circuit 130 and interrogate signal 132 could be realized using a CMOS microcomputer chip as is used in the portable unit 24. In such a case, a single control element (integrated circuit chip) 138 is all that is required for these elements. Preferably, the timer circuit 130 and the interrogate signal generator 132 are simply realized using the same configuration as is shown for the timer circuit 52 and encoder circuit 50 of the transmitting unit 20 (FIG. 3).

In one embodiment, the frequency of the signals transmitted by the transmitting unit 20, the portable transceiving unit 24, and the stationary unit 26, is approximately 200 KHz. This is a preferred operating frequency because it falls within a range that is not tightly regulated by the FCC (Federal Communications Commission), thereby precluding the need for special operating licenses. Further, 200 KHz is a frequency that does not interfer with other typical equipment used in the hospital environment. For some applications, it may be preferable to configure the portable unit 24 (which configuration is advantageously realized by properly programming the microcomputer 90) so that the response signal 34, transmitted in respone to the interrogate signal 32, is a slightly different frequency, e.g. 250 KHz, in order to preclude any possiblity of an error being logged into the memory of a portable unit 24 if two nurses, for example, happen to be within the specified distance of each other and the stationary unit 26 at the same time. Unique codes could also be used to prevent this possiblity.

Advantageously, before any information is stored into a specified memory location of the portable unit 24, the portable unit 24 must be within the specified range of the transmitting unit 20 for the specified time. This is achieved by setting an appropriate qualification criteria before a given code is time-logged to the memory of the portable unit 24. Such criteria is readily set by programming the microcomputer 90. One such criterion requires that at least two consecutive reads indicate that the same code as been received. This means that the portable unit must be within the specified distance (e.g. the range of receiving the signal, which will typically be around five feet) for at least thirty seconds (assuming the transmitting unit transmits a signal every fifteen seconds) before the information is time-logged into the portable unit's memory. Another suitable criterion requires that at least three of the four signals received in any given minute correspond to the same code. This requires that the nurse or doctor actually be within the specified distance of the patient or other object for about a minute, and would provide enough flexibility so that one of the transmissions could have a read error associated therewith. Of course, as those skilled in the art will recognize, there are numerous error detecting and correction schemes that can be used in order to insure that the coded information is accurately transmitted from the transmitting unit 20 to a portable transceiving unit 24. Any of these techniques may be used and readily implemented within the portable unit 24 because of the flexibility afforded through use of the microcomputer 90.

Figure 11:
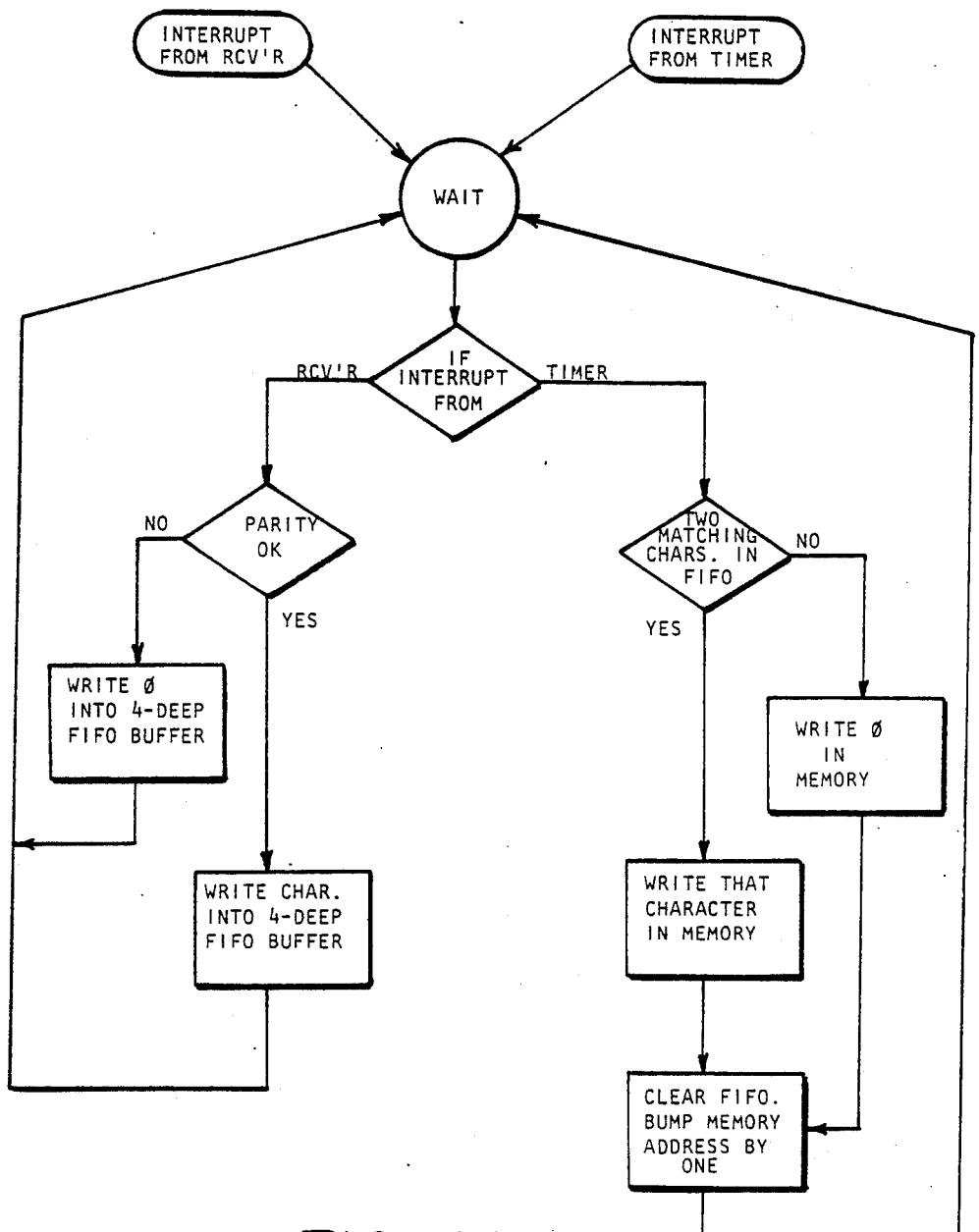
FIG. 11 is a simplified flow chart indicating a respresentative operating program that may be used by the CPU in FIG. 1 in conjunction with the system of the present invention.

The actual programming of the microcomputer 90, while not a trivial task, is viewed as one that can be carried out by those skilled in the programming art given the intended functions of the present invention. A simplified flow chart of the basic functions to be performed by the microcomputer 90 is shown in FIG. 11.

Figure 12:
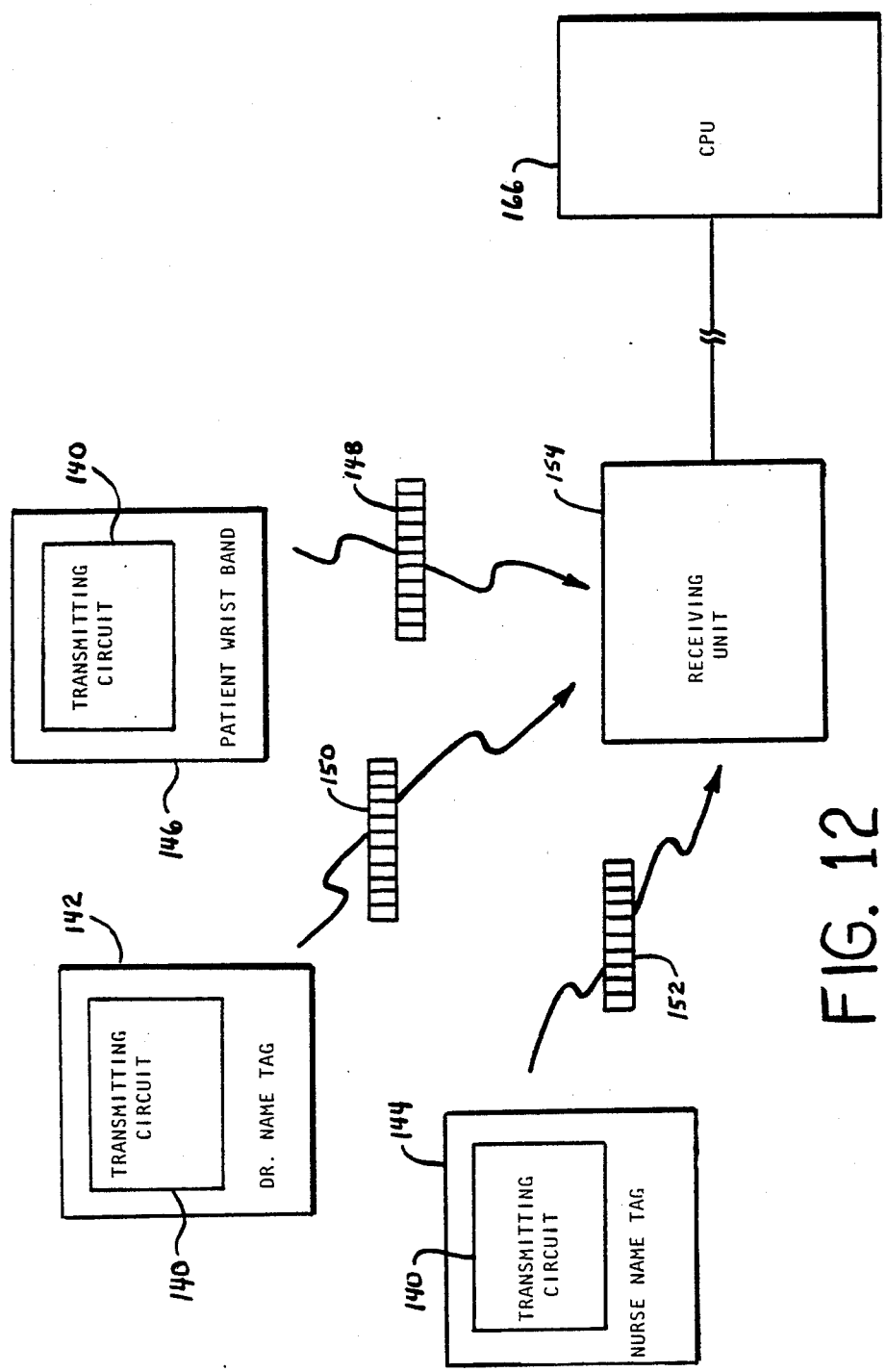
FIG. 12 is a block diagram illustrating the principal elements of an alternative embodiment of the present invention.

An alternative embodiment of the time and accounting system of the present invention is shown in FIG. 12. In accordance with this alternative embodiment, a small portable transmitting circuit 140 is embedded or otherwise housed within a name tag 142, 144 of key hospital personnel, such as doctors and nurses, and within the identification wrist bands 146 of the hospital patients. This transmitting circuit may be as shown in FIG. 3, or of a similar design.

A unique code word, schematically depicted in FIG. 12 as the word blocks 148, 150, 152, is transmitted over a limited range (e.g., 5–10 feet) by each transmitting ciruit at a relatively slow interval. The transmitting interval is selected to be a different value depending upon the type of person from whom it originates. That is, a patient's wrist band 146 may have a circuit 140 therein that transmits its unique code word 148 every 15 seconds, while a doctor's name tag 142 may have it transmitting circuit 140 transmit its code word 150 every 5 seconds. A nurse's name tag, on the other hand, my have its circuit 140 transmit its unique code word every 3–4 seconds. In this fashion, it is not likely that the code words from different personnel will "step on" each other (occur at precisely the same time), and even if they do, such an occurrence will be an isolated incident which will not reoccur often.

The transmitted code words are received and logged into a receiving unit 154. Advantageously, even if two of the same type of personnel, e.g., two nurses, are in the same area at the same time, the likelihood that both of their units (name tags) will transmit their code words at precisely the same time in synchronism with the other is extremely remote. Hence, both code words may be logged into the receiving unit without one continually interferring with the other.

The receiving unit 154 of FIG. 12 is placed in close proximity to each patient and at other key locations throughout the hospital. The unit 154 is shown in greater detail in FIG. 13. It includes a receivng ciruit 156, which may be of conventional design; a buffer circuit 157; a clock circuit 158; a receiving unit ID generator 161; a composite code word (CCW) word generator 160; a CCW storage device or element 162; and means for transmitting or downloading the CCW's stored in the storage device 162 to a host central processing unit (CPU) 166.

In operation, the receiving unit 154 receives the transmitted code words, from whatever source, through an antenna coil 155. The received code word is momentarily held in the buffer circuit 157 prior to being passed to the CCW generator 160. The CCW generator 160 combines the information contained within the code word (which information comprises the identity of the code word's source, such as a specific doctor, nurse, or patient) with the time of day that the code word was received and the location whereat the code word was received. The time of day is maintained in the clock circuit 158 and the location of the receiving unit is generated by the receiving unit ID word generator 160.

The ID word generator 161 may be realized in several ways. For example, a simple component, commonly known as a jumper block or shorting block, could be used to set a desired code through the selective breaking of an array of conductive strips. Such devices are commercially available from numerous sources and may be simply "plugged-in" to a standard dual-in-line package socket or pc board pattern. Once installed into the circuit, the device is "programmed" to hardwire a unique code that thereafter uniquely identifies the receiving unit within which it is installed. Similar devices are available wherein the code is set by selectively setting an array of small switches, in which case the code can be changed from time to time. In one embodiment, the code word is used to uniquely identify the receiving unit. The location at which that particular receiving unit is placed within the hospital is then logged into a table within the CPU 166. When the CPU 166 receives the CCW's from the various receiving units, explained more fully below, it performs a table look-up operation in order to assign a specific location to each CCW that is being processed in accordance with the information contained within the look-up table. In another embodiment, the ID code word generator 160 is not programmed until the receiving unit 154 is placed in its desired location, and then the code word is selected to have embodied therein the desired location-identifying information. In either embodiment, the CPU 166 is readily able to determine the location from which a given CCW originated.

The clock circuit 158 is of conventional design. When a complete code word has been received in the buffer 157, the clock circuit passes the time of day at that instant to the CCW generator 160, which information is then inluded within the combined code word, or CCW. In the preferred embodiment, times are embedded with the comibned code word to the nearest 0.1 seconds, although any suitable degree of accuracy in this time measurement could be used. An alternative embodiment, not shown in FIG. 13, couples the clock circuit 158 to the storage device 162, wherein one storage location is set aside for each designated time interval, e.g., every second. If a code word is received by the receivng circuit 156 during that time interval, it is stored at the memory location set aside for that particular time interval. When the contents of the memory device are downloaded to the CPU 166, they are downloaded in a prescribed sequence so that the CPU can identify which code words were stored at which location, thereby assigning a time interval to each code word. Hence, in this alternative embodiment, the design and operation of the receiving unit 154 is very similar to the portable unit 24 described previously in connection with FIGS. 1 and 7.

Figure 13:
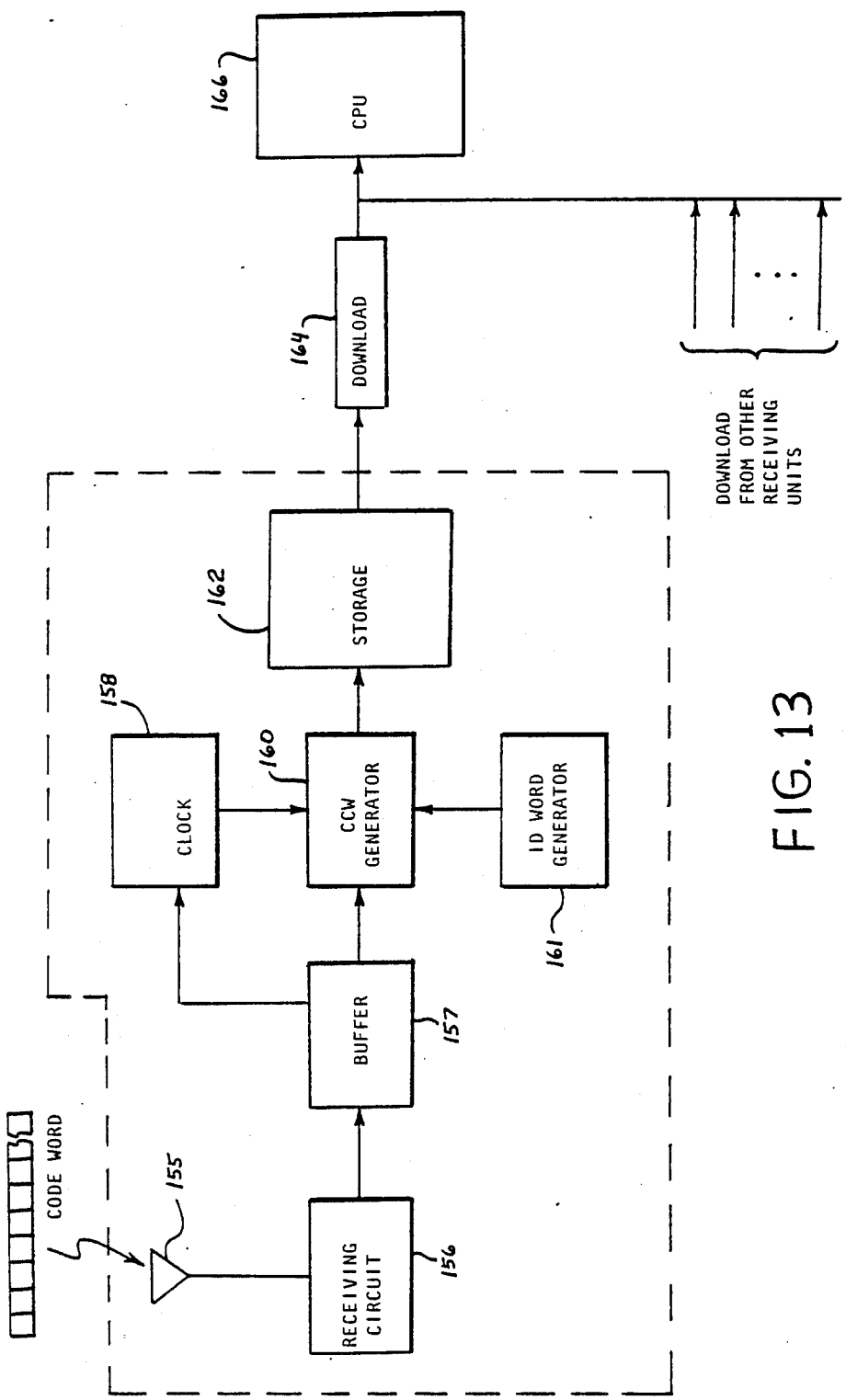
FIG. 13 is a block diagram of one embodiment of the receiving unit of FIG. 12.

Still referring to FIG. 13, at designated times, the contents of the CCW storage device 162 are downloaded to the CPU 166 through the download means 164. The CPU then processes all of the CCW's received over a given period of time in order to identify which patients, doctors, and nurses (or other hospital personnel) were in contact with each other, how long the contact occurred, and where the contact took place. This information, as described previoulsy, provides an accurate log from which billing and other useful information can be easily and automaticcally generated.

"Contact", as described above, is determined by comparing CCW's and identifying those CCW's logged (stored) into the same receiving unit (and hence originating at the same location) within a given time window (and hence at approximately the same time). In operation, the patient's code word 148 (FIG. 12) is logged into the receiving unit 154 located near the patient's bed approximatey every 15 seconds for so long as the patient remains in his or her room within range of the receiving unit 154. If a doctor or nurse enters the room, their unique code words will likewise be logged into the receiving unit 154 for so long as they remain within range of the receiving unit 154. Should the patient temporarily leave the room, such as to go to the restroom or to go for a walk, then no "contact" will be recorded through that particular receiving unit even though a doctor or nurse may enter the room and have thier codes logged into that receiver during that time. In order to eliminate the possibility that a brief chance meeting of a doctor or nurse with a patient is recorded as a "contact", the CPU 166 can be programmed to look for more than one consequtive "hit" (doctor or nurse code word coincident in same time window with patient code word) before indicating that a contact has occurred. For example, if the doctor's unit transmits a code word every 5 seconds, the CPU can be programmed to look for at least twenty (20) doctor code words out of a sequence of thirty (30) possible doctor code words before determining that a doctor-patient contact has occurred.

As indicated, the CCW's stored in the storage device 162 are downloaded to the CPU 166 via the download means 164. This downloading may be accomplished in numerous ways, as those skilled in the art will recognize. In the preferred embodiment, each receiving unit 154 is hard-wired to the CPU 166. Downloading occurs under direction and control of the CPU 166 whenever the CPU is ready to receive the downloaded data. The CCW's are typically represented as one or two bytes of digital data that can readily be transmitted over long distances using well known serial data transmission techniques. If a hard-wire connection is not available, data can easily be transmitted using telephone lines.

The storage device 162 of the receiving unit 154 may be realized using numerous types of storage elements. In the preferred emobidment, it is RAM storage of suitable capacity. RAM devices are commercially available that will store up to 32 Kilobytes (256 Kbits) of data. Alternatively, for the type of data that is being stored, a conventional floppy disk drive or tape drive could be used as the storage device. Optical or magnetic bubble storage devices could also be used for this purpose. In such a case, if a hard-wire download capability did not exist, download could be effectuated by simply hand-carrying the floppy/optical disk or reel/cassette of tape created by the receiving unit to the CPU 166, whereat the data could be loaded into the CPU for processing. Alternatively, both RAM and magnetic/optical storage devices could be used, with the magnetic/optical storage devices serving as a backup of the RAM storage elements.

Advantageously, the useful life of the transmitting units 20 may be essentially as long as the shelf life of the batteries used therein. This is because of the very low duty cycle associated with these transmitting devices. That is, the uniquely coded signal is only transmitted approximately every three to fifteen seconds, and the actual length of the word transmitted is only on the order of ten msec. Therefore, for all practical purposes, the battery is hardly used at all. In particular, if some of the lithium batteries currently being sold on the market are used, the operating life of the unit 20 will be several years. Even if the standard silver oxide batteries, also readily commercially available, are used, the life of the device will easily exceed one year.

While the invention herein disclosed has been described by means of a particular embodiment thereof, numerous changes and modifications could be made thereto by those skilled in the art without departing from the spirit and scope thereof. The invention is intended to be limited only by the scope of the amended claims.

What is claimed is:

1. A system for recording the interaction between a plurality of objects, at least one of which objects moves relative to the other objects, said system comprising:

transmitting and generating means for generating a uniquely coded signal and for transmitting said uniquely coded signal at prescribed intervals, said transmitting and generating means being attached to a selected one of said plurality of objects; whereby said uniquely coded signal thereafter identifies said selected object; and receiving means for receiving said uniquely coded signal only when said transmitting and generating means and said receiving means remain within a specified distance of each other, said receiving means including recording and timing means for recording the receipt of the uniquely coded signal, including the time at which the uniquely coded signal was received, said recording and timing means comprising means for generating a first code signal representative of the location of the receiving means, means for generating a second code signal representative of the time at which the uniquely coded signal is received from said transmitting and generating means, means for combining said first code signal and said second code signal with said uniquely coded signal to generate a combined code word (CCW), and means for storing said combined code word for subsequent retrieval;

whereby the combined code word generated within the receiving means may be examined to determine the time at which a particular transmitting and generating means came within the specified distance of the receiving means and the duration of time during which said specified distance was maintained, thereby providing an indication of the interaction between the selected objects and said receiving means.

2. The system of claim 1 further including a central processing unit (CPU) that receives combined code words from a plurality of receiving units selectively placed in and around a prescribed area wherein said plurality of objects interact.

3. A receiving device for use with a plurality of beacon units, each beacon unit being attached on or near a selected movable object, each beacon unit including transmitting means for transmitting at selected intervals an identifying signal that is receivable within a specified range, said receiving device comprising:

means for receiving said identifying signal when one of said beacon units moves to within the specified range from said receiving device;

means for generating a first code signal representative of the location of the receiving unit;

means for generating a second code signal representative of the time at which the identifying signal is received from one of said beacon units;

means for combining said first code signal and said second code signal with said identifying signal to generate a combined code word;

memory means located in said receiving device for storing the combined code word therein, said memory means comprising:

a multiplicity of memory locations where information can be stored, and control means for storing the combined code word in a desired memory location; and examination means for examining the contents of said memory means.

4. A method for generating a history of the interaction between a group of objects, said method comprising the steps of (a) assigning a unique code to each one of the objects;

(b) transmitting a signal modulated by said unique code from each of said objects;

(c) receiving said modulated signals at one of a plurality of receiving units only when the distance between any object and said one receiving unit is less than a prescribed distance;

(d) demodulating the signals received by the receiving unit in order to recover the unique code therefrom;

(e) combining the unique code with a time code to form a combined code word, and storing said combined code word in memory means located within said one receiving unit, said time code indicating the time period during which the modulated signal was received; and (f) at the end of a desired period of time, examining the combined code words stored in said memory means and generating a history therefrom, said history indicating the interaction between the group of objects and said one receiving unit.

5. The method of claim 4, wherein step (f) comprises examining the combined code words stored in said memory of all of said plurality of receiving units and generating said history therefrom, said history indicating the interaction between the group of objects and all of said receiving units.

6. The method of claim 4 wherein the combined code word formed in step (e) further includes a location code that represents the location of said one receiving unit.

* * * * *